United States Patent [19]

Errichiello

[11] 4,294,558

[45] Oct. 13, 1981

[54] WEATHERPROOF PORTFOLIOS

[76] Inventor: Dominic R. Errichiello, 389 Meadowlark Rd., Bloomingdale, Ill. 60108

[21] Appl. No.: 63,865

[22] Filed: Aug. 6, 1979

[51] Int. Cl.³ .......................... A45C 3/02; B65D 43/14
[52] U.S. Cl. ........................................ 402/75; 150/1.6; 150/12; 190/41 R; 206/215; 220/306; 220/339
[58] Field of Search ........................ 402/73, 74, 75, 76; 150/1.6, 57 B, 12; 190/16, 41 R, 51; 206/811, 454, 451, 215; 281/31; 220/306, 339

[56] References Cited

U.S. PATENT DOCUMENTS

| | | | |
|---|---|---|---|
| 1,985,521 | 12/1934 | Schell | 281/31 X |
| 3,010,552 | 11/1961 | Davidson | 190/41 R |
| 3,346,099 | 10/1967 | Thomas et al. | 206/811 X |
| 3,483,954 | 12/1969 | Michalski | 190/51 X |
| 3,861,556 | 1/1975 | Barecki | 150/1.6 X |
| 3,891,070 | 6/1975 | Montanari | 402/76 X |
| 3,908,852 | 9/1975 | Ricobene | 206/545 X |

*Primary Examiner*—Paul A. Bell
*Assistant Examiner*—John S. Brown
*Attorney, Agent, or Firm*—Keil and Witherspoon

[57] ABSTRACT

Weatherproof portfolios which are integral moldings of a thermoplastic polymer forming an elongated spine having a first side panel and a second side panel respectively hingedly mounted on respective, opposite, longitudinal edges of said spine, each panel having two integrally molded side flanges connected by an integrally molded top flange to form two, respective, substantially identical enclosures on respective panels, the longitudinal edges of said two side flanges and said top flange of the respective enclosures being aligned when said side panels are swung about their hinges from an open position toward each other and into abutting contact in the closed position, and grooves in the longitudinal edges of the side and top flanges on one side panel and longitudinal mating tongues or ribs on the longitudinal edges of the side and top flanges of the other side panel to provide substantially weathertight seals when the portfolio is closed.

4 Claims, 6 Drawing Figures

WEATHERPROOF PORTFOLIOS

BACKGROUND AND BRIEF DESCRIPTION OF THE INVENTION

The subject invention pertains to portfolios for carrying papers, books and the like. There are many kinds and styles of briefcases or portfolios on the market today, ranging from inexpensive vinyl envelopes with a plastic zipper on or near the top edge to expensive, attractive, hard shell, leather covered portfolios with metal hinges and special handles. The portfolios of the subject invention are inexpensive to manufacture but at the same time are attractive in appearance. They comprise integral moldings of a thermoplastic polymer to form a first side panel and a second side panel respectively hingedly mounted on respective, opposite, longitudinal edges of the spine by living hinges. Each panel has two integrally molded side flanges connected by an integrally molded top flange to form two, respective, three-sided enclosures on respective panels. The longitudinal edges of said two side flanges and said top flange of the respective enclosures are abutted when said side panels are swung about their hinges from an open position toward each other and into abutting contact of said flanges in the closed position. An elongated snap-ring assembly may be mounted on the inside face of the elongated spine. The longitudinal edges of the flanges preferably have sealing means to provide a substantially water-tight seal between said edges when they are in abutting contact.

The preferred form of said sealing means comprises longitudinal grooves in the longitudinal edges of the side and top flanges on one side panel and longitudinal mating tongues or ribs on the longitudinal edges of the side and top flanges of the other side panel. A handle may be integrally molded on the spine-remote edge of at least one of said side panels. Another feature of the invention is the mating tongue and groove interlock means on the longitudinal edges of said top flanges to releasably hold said portfolio in closed position.

The portfolios may further have substantially triangular wall near each end of said spine and aligned with respective side flanges on the respective panels. The side flanges each have a diagonal edge adjacent said spine, which edge abuts against one of the diagonal walls of said triangular wall when said portfolio is in the closed position. Sealing means much as the above described tongues and grooves preferably are provided on the edges of said diagonal walls to provide a substantially water-tight seal between said edges when they are in abutting contact.

PREFERRED EMBODIMENTS

Preferred embodiments of the invention are illustrated in the drawings, wherein:

IN THE DRAWINGS

Figure 1:
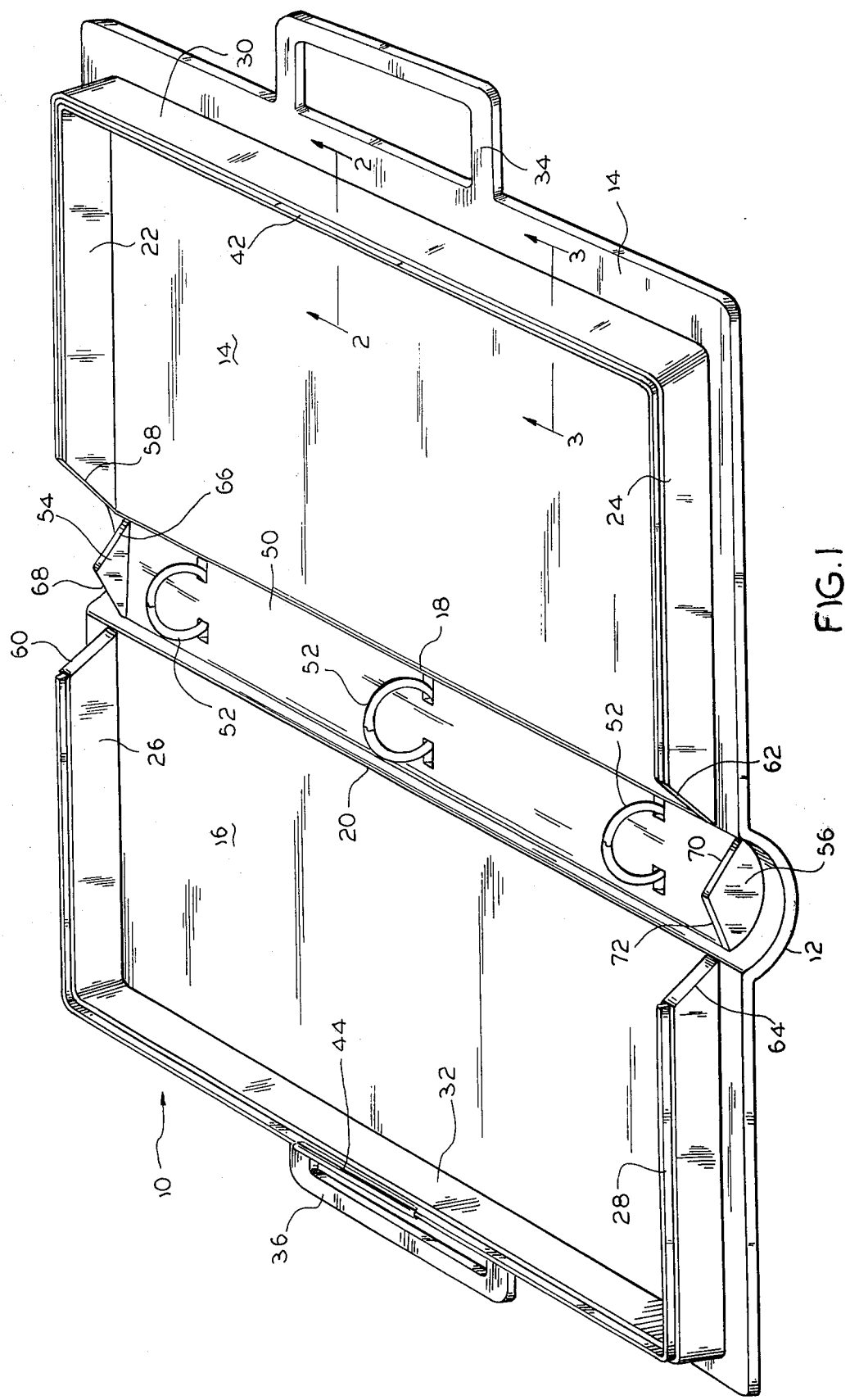
FIG. 1 is a perspective view of a first portfolio embodiment in the open position.
Figure 2:
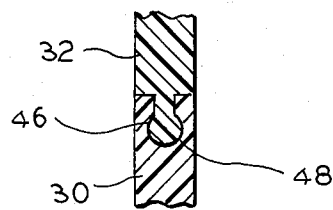
FIG. 2 is a fragmentary section view taken on section plane A—A of FIG. 1 when the portfolio is closed.

Referring to the drawings, the portfolio 10 comprises an integral molding of an elongated spine 12 and two side panels 14, 16 respectively hingedly connected to the opposite longitudinal edges of the spine by integrally molded, living hinges. The respective side panels 14, 16 each have integral side flanges 22, 24 and 26, 28 connected by a top flange 30 and 32, respectively. The flanges are recessed a small distance from the three edges of each panel but may be flush therewith if desired.

Figure 3:
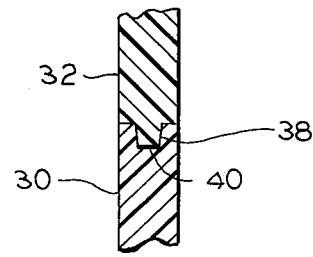
FIG. 3 is a fragmentary section view taken on section plane B—B of FIG. 1 when the portfolio is closed.

Each panel 14, 16 has a handle 34, 36 integrally molded on its spine-remote edge, the handles being in alignment when the portfolio is closed. The abutting edges of the flanges 22–23 are made weather-tight by providing, as shown in FIG. 3, longitudinal tongues or ribs 38 on the edges of the flanges 26, 28, 32 (or on the edges of the flanges 22, 24, 30) and longitudinal grooves 40 in the edges of the flanges 22, 24, 30 (or in the edges of the flanges 26, 28, 32). The ribs or tongues and the grooves have a close, but not tight fit.

The portfolio has means to keep it in the closed position. Preferably, the segments 42 and 44 of the edges of the top walls 30, 32 nearest the handles 34, 36 have a different longitudinal tongue or rib and longitudinal groove arrangement whereby the tongue or rib 46 snap fits or relatively tightly fits in the groove 48, e.g., by providing on the edge of the tongue or rib a longitudinal bead which is slightly wider than the entrant neck of the groove.

If desired, the inner face of the spine 12 may have mounted thereon a snap ring assembly 50 having a plurality of split rings 52 for mounting thereon hole-punched paper sheets. Such snap ring assemblies and the mounting thereof in longitudinal cavities in the molded spines are described more fully in my co-pending application Ser. No. 63,863, filed Aug. 6, 1979 and Ser. No. 63,864, filed Aug. 6, 1979.

A weathertight seal between the spine and the spine-adjacent segments of the side flanges 22–28 is achieved by providing substantially triangular walls 54, 56, near opposite ends of the spine. The latter walls are aligned with the respective side walls 22, 26 and 24, 28. The diagonal innermost edges 58, 60 and 62, 64 abut against diagonal edges 66, 68 and 70, 72 respectively, of the walls 54, 56 when the portfolio is closed. Preferably, the abutting edges have a rib or tongue-groove seal like that shown in FIG. 3.

Figure 4:
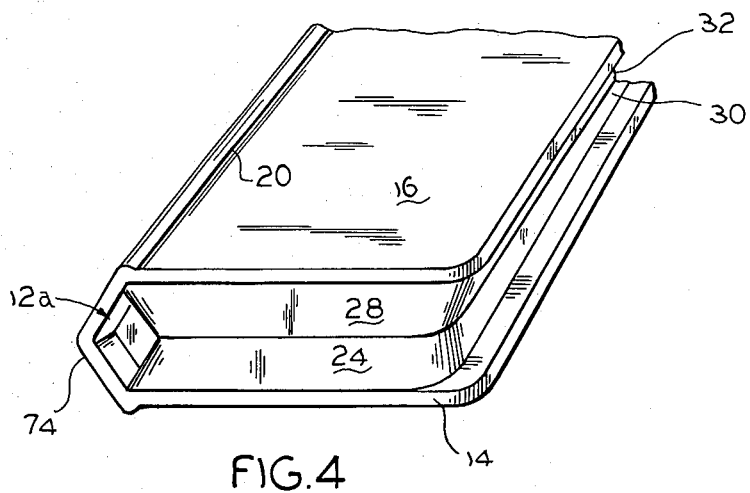
FIGS. 4-6 are fragmentary, perspective views of three additional portfolio embodiments as they appear in the closed position.
Figure 5:
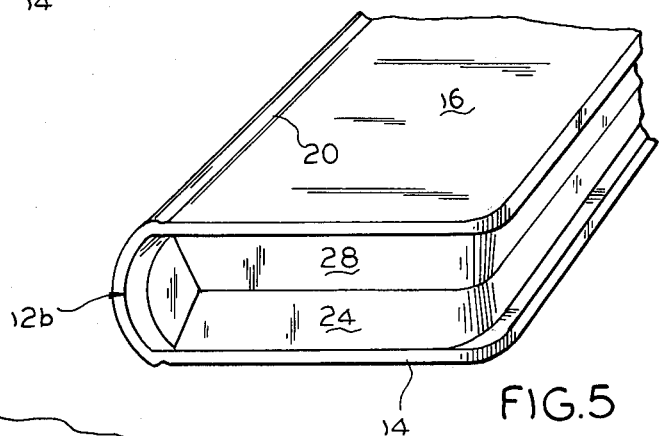
Figure 6:
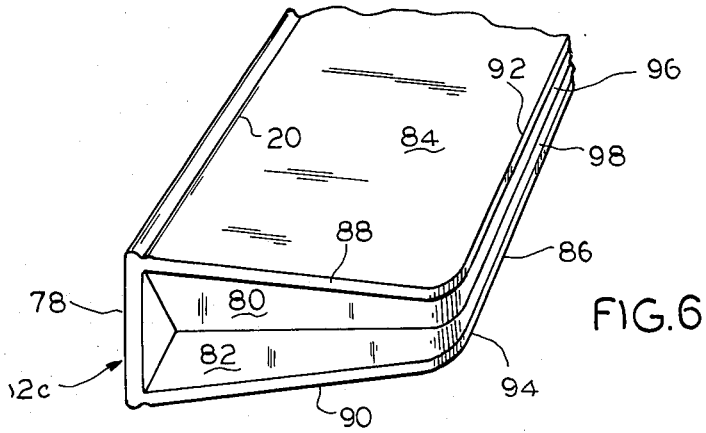

The embodiments of FIGS. 4-6 mainly illustrate different styles or configurations of the spine, the flanges and the side panels. In FIG. 4, the spine 12a has a transversely tapered rear face 74; in FIG. 5, the rear face 7b of the spine 12b has a transversely oval or rounded configuration, as in the case of spine 12 in FIG. 1; while the portfolio of FIG. 6 has a flat rear face 78 on its spine 12c, tapered side flanges 80, 82 which provide a taper between the side panels 84, 86 and flush corners 88, 90, 92, 94 between the panels and the side flanges 80, 82 and the top flanges 96, 98.

It will be appreciated from the foregoing that the invention herein can take many forms other than the preferred forms shown in the drawings and that the invention as herein claimed is not limited to the illustrated embodiments.

I claim:

1. An integrally molded weatherproof portfolio of a thermoplastic polymer comprising an elongated spine having a first side panel and a second side panel hingedly mounted on respective, opposite, longitudinal edges of said spine, each said panel having two integrally molded side flanges connected by an integrally molded top flange to form two opposite, three-sided, substantially identical enclosures on respective panels, the longitudinal edges of said two side flanges and said top flange of the respective enclosures being aligned when said side panels are swung about their hinges from an open position toward each other and into abutting contact by said flanges in the closed position, and sealing means comprising longitudinal tongues and mating longitudinal grooves on respective longitudinal edges of said flanges providing a substantially water-tight seal when the edges of respective enclosures are in abutting contact;

and a substantially triangular wall near each end of said spine and aligned with respective side flanges on the respective panels, said side flanges each having a diagonal edge adjacent said spine, which edge abuts against one of the diagonal walls of said triangular wall when said portfolio is in the closed position, and sealing means on the respective edges of said diagonal walls to provide a substantially water-tight seal between said edges when they are in abutting contact.

2. A weatherproof portfolio as claimed in claim 1, and an elongated snap-ring assembly mounted on the inside face of said elongated spine.

3. A weatherproof portfolio as claimed in claim 1, and a handle integrally molded on the spine-remote edge of at least one of said side panels.

4. A weatherproof portfolio as claimed in claim 3, and mating tongue and groove interlock means on the longitudinal edges of said top flanges to releasably hold said portfolio in closed position.

* * * * *